United States Patent
Colarossi et al.

(10) Patent No.: US 11,018,843 B2
(45) Date of Patent: May 25, 2021

(54) SENSOR COMMUNICATION CONTROL SHAPED FOR EMC COMPLIANCE

(71) Applicant: VEONEER US, INC., Southfield, MI (US)

(72) Inventors: Vincent Colarossi, Dearborn Heights, MI (US); Grant Scott, South Lyon, MI (US); Stuart Koch, West Bloomfield, MI (US); Michael C. Campbell, Canton, MI (US)

(73) Assignee: VEONEER US, INC., Southfield, MI (US)

( * ) Notice: Subject to any disclaimer, the term of this patent is extended or adjusted under 35 U.S.C. 154(b) by 0 days.

(21) Appl. No.: 16/375,241

(22) Filed: Apr. 4, 2019

(65) Prior Publication Data
US 2020/0322123 A1    Oct. 8, 2020

(51) Int. Cl.
*H04L 7/00* (2006.01)

(52) U.S. Cl.
CPC ................... *H04L 7/0087* (2013.01)

(58) Field of Classification Search
CPC ..................................................... H04L 7/0087
See application file for complete search history.

(56) References Cited

U.S. PATENT DOCUMENTS

| | | | | |
|---|---|---|---|---|
| 9,065,560 B2* | 6/2015 | Hamperl | ................... | H04Q 9/00 |
| 9,647,680 B2* | 5/2017 | Levy | ....................... | H04B 1/707 |
| 2004/0208269 A1 | 10/2004 | Chen et al. | | |
| 2005/0229028 A1 | 10/2005 | Findlay et al. | | |
| 2012/0269253 A1* | 10/2012 | Daecke | .................... | H04B 3/14 |
| | | | | 375/232 |
| 2014/0301432 A1* | 10/2014 | Szuecs | ................ | G06F 13/4072 |
| | | | | 375/220 |
| 2014/0358377 A1* | 12/2014 | Hammerschmidt | .... | B60R 21/01 |
| | | | | 701/45 |
| 2014/0379165 A1 | 12/2014 | Weiss | | |
| 2015/0030111 A1* | 1/2015 | Nitsche | ................. | H04L 7/0091 |
| | | | | 375/354 |
| 2015/0151701 A1* | 6/2015 | Weiss | ...................... | B60R 21/01 |
| | | | | 307/9.1 |
| 2015/0169022 A1* | 6/2015 | Gauger | ................. | H04L 12/403 |
| | | | | 713/320 |
| 2015/0321629 A1* | 11/2015 | Siemss | ...................... | H04L 7/06 |
| | | | | 307/9.1 |
| 2016/0378425 A1* | 12/2016 | Lorenz | ................... | G06F 3/167 |
| | | | | 381/86 |
| 2019/0305724 A1* | 10/2019 | Colarossi | ............... | B60R 21/01 |

OTHER PUBLICATIONS

International Search Report in related PCT application PCT/US2020/026436, dated Aug. 27, 2020.

* cited by examiner

*Primary Examiner* — Freshteh N Aghdam
(74) *Attorney, Agent, or Firm* — Dickinson Wright PLLC

(57) ABSTRACT

A restraint control module is provided in this disclosure. The restraint control module is configured to communicate a sync pulse to a sensor. The control module may include a sync pulse driver circuit and a memory. The memory may store the waveform profile of a sync pulse. The sync pulse driver circuit generates a sync pulse in response to the waveform profile stored in the memory. The sync pulse may be transmitted to one or more sensors. The waveform profile stored in the memory may be derived from a sync pulse with reduced electro-magnetic emissions by applying spectrum analysis.

12 Claims, 6 Drawing Sheets

SENSOR COMMUNICATION CONTROL SHAPED FOR EMC COMPLIANCE

BACKGROUND

The Peripheral Sensor Interface 5 (PSI5) interfaces have a signal called a sync pulse that synchronizes sensors on a communication bus. The sync pulse is a relatively high level/high speed signal that can generate unwanted electromagnetic emissions from the sensor wires and may cause the restraint module to fail original equipment manufacturer (OEM) electro-magnetic compatibility (EMC) tests.

BRIEF SUMMARY

A restraint control module is provided in this disclosure. The restraint control module is configured to communicate a sync pulse to a sensor. The control module may include a sync pulse driver circuit and a memory. The memory may store the waveform profile of a sync pulse. The sync pulse driver circuit generates a sync pulse in response to the waveform profile stored in the memory. The sync pulse may be transmitted to one or more sensors. The waveform profile stored in the memory may be derived from a sync pulse with reduced electro-magnetic emissions by applying spectrum analysis.

DETAILED DESCRIPTION OF THE DRAWINGS AND THE PRESENTLY PREFERRED EMBODIMENTS

The New Proposed sensor communication control (Sync Pulse) is reshaped via mathematical spectral analysis and subsequent waveform artifact reductions to minimize EMC emissions and provide PSI5 functionality for existing sensors. The control of the sync pulse driver is to provide a DC bias voltage and pulsed value consistent with the existing single-ended solution to be compatible with the existing sensors. Further reductions in EMC emissions beyond the waveshaping can be provided by balanced output impedance and the twisted pair wire communication concept, which all work to attenuate EMC emissions with this newly shaped sync pulse driver concept in a low cost fashion. The reduction in EMC emissions has been measured at 10 dBuV at 100 kHz. This new proposal will provide PSI5 functionality for existing sensors and reduced EMC emissions.

Figure 1:
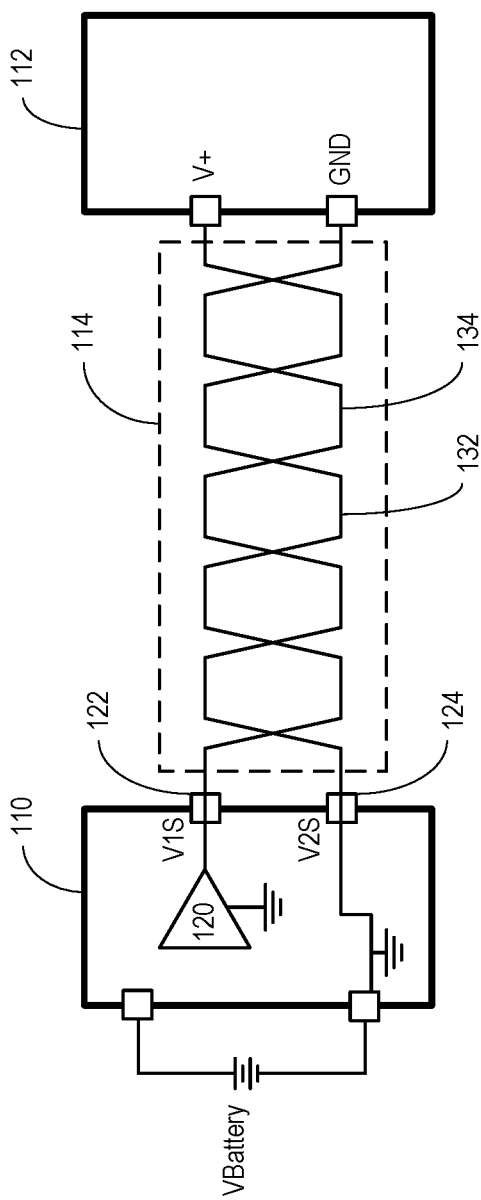
FIG. 1 is a schematic view of system including a controller in communication with a sensor.

FIG. 1 is a schematic view of a PSI5 compatible controller 110 in communication with a sensor 112 using the PSI5 communication protocol. The controller 110 communicates with the sensor 112 over a cable 114. The cable may include a twisted pair of conductors for example, wire 132 and wire 134. The sensor 112 may be a pressure sensor, accelerometer, moisture sensor, or other common automotive sensor. PSI5 compatible communication utilizes a sync signal that includes a pulse. In one implementation, the driver 120 may generate a pulse that is delivered to a first terminal 122 of the controller and communicated to the sensor 112 through a first wire 132. The pulse may be generated by the driver 120 relative to ground. Ground may be tied to terminal 124 and provided as a reference to the sensor through wire 134. Providing the signal in the manner through the twisted pair of wires 132, 134, electrical noise along the cable path may be minimized.

Figure 2:
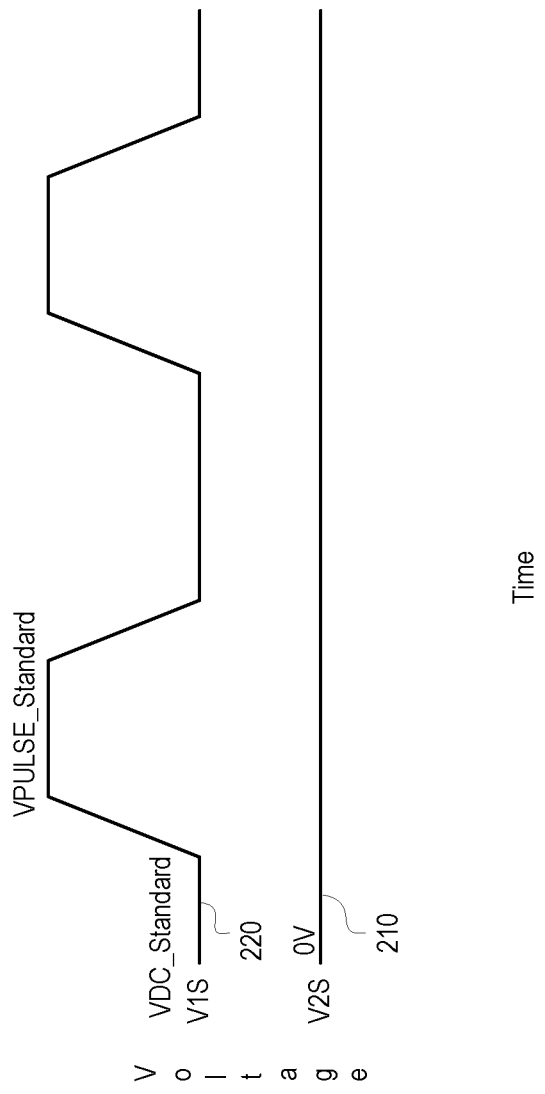
FIG. 2 is an illustration of the standard sync pulse signals provided by the controller of FIG. 1.

FIG. 2 is an illustration of a standard sync pulse signal as provided by the PSI5 specification. The standard sync pulse signal would be generated by controller 110. The signal 210 may correspond to the electrical ground provided through wire 134 to the sensor 112. Signal 220 may correspond to the sync pulse generated by the driver 120 and provided to the sensor 112 through wire 132. The sync pulse 220 may be offset or include a DC bias from the electrical ground 210.

Figure 3:
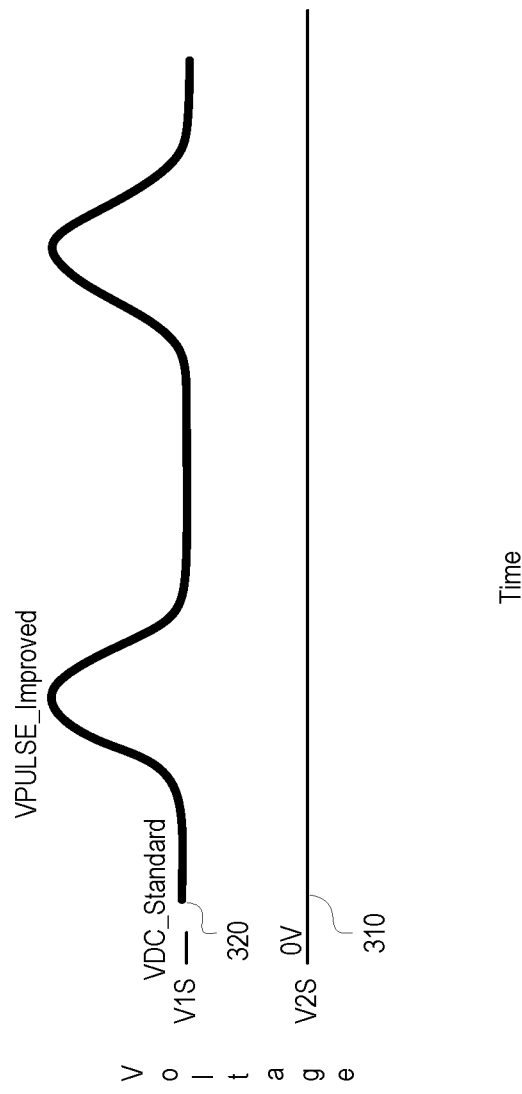
FIG. 3 is an illustration of an improved sync pulse signal provided by the controller of FIG. 1.

FIG. 3 is an illustration of an improved sync pulse signal as provided by the processes described throughout this application. The improved sync pulse signal would be generated by controller 110. The signal 310 may correspond to the electrical ground provided through wire 134 to the sensor 112. Signal 320 may correspond to the sync pulse generated by the driver 120 and provided to the sensor 112 through wire 132. The sync pulse 320 may be offset or include a DC bias from the electrical ground 310.

Figure 4:
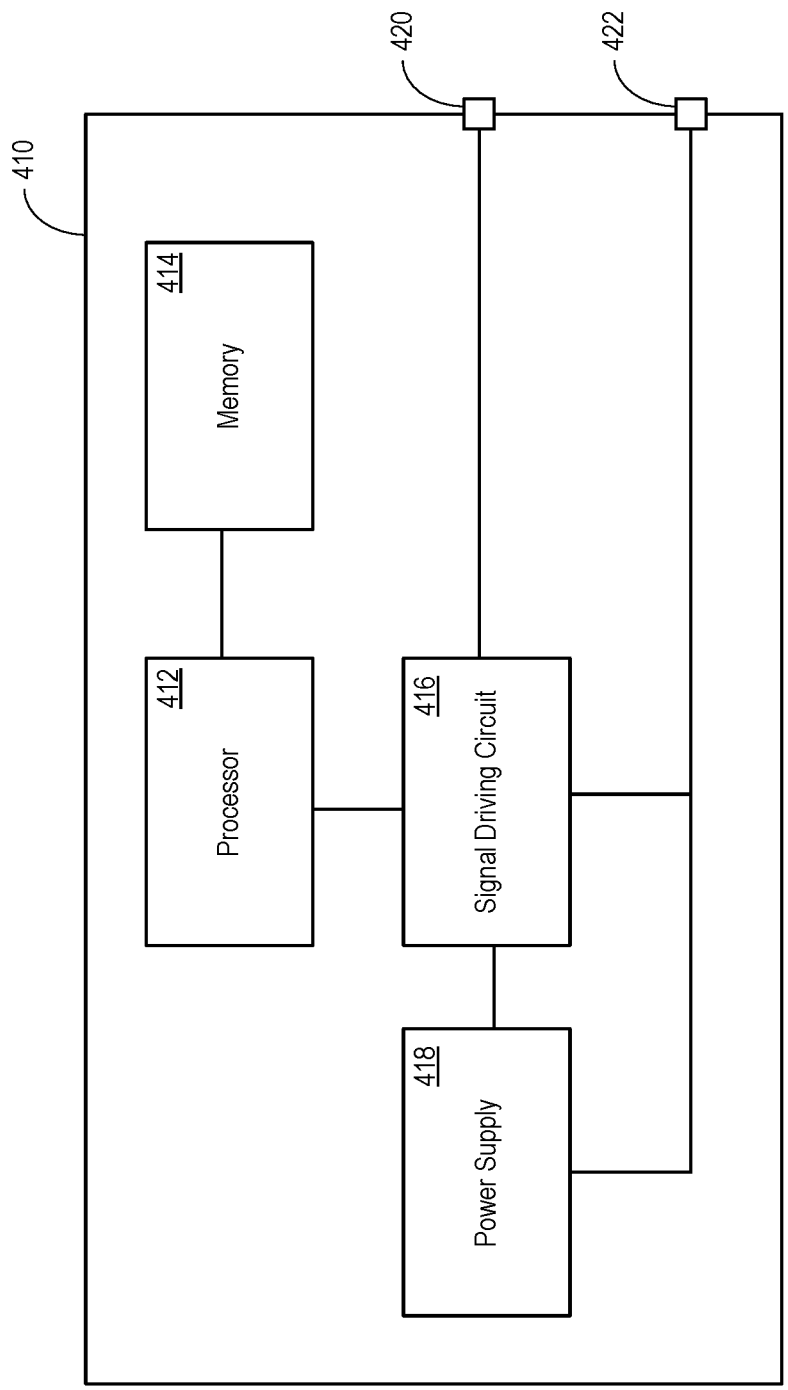
FIG. 4 is block diagram of components of a sensor controller.

FIG. 4 is a block diagram of a sensor controller 410. The controller 110 of FIG. 1 may be of the type described with respect to sensor controller 410. The controller 410 may include a processor 412, a memory 414, and a signal driver circuit 416. The processor 412 may generate a waveform profile for an improved sync pulse signal as provided elsewhere in this application. The processor 412 may store the waveform profile for the improved sync pulse signal in the memory 414. The memory 414 may be a random access memory, a static memory, programmable memory or other memory device. The processor 412 may retrieve the waveform profile from the memory 414 to generate an improved sync pulse signal corresponding to the waveform profile through the signal driving circuit 416. The signal driving circuit 416 may utilize power from the power supply 418 to generate the sync pulse signal and transmit the sync pulse signal to a sensor through a positive terminal 420 and a negative terminal 422. The processor 412 or the signal driving circuit 416 may scale or shift the sync pulse signal along the voltage axis (e.g. amplitude), the time axis, or both. The scaling or shifting may be applied to the waveform profile (e.g. in the processor) to generate an adjusted waveform profile prior to sync pulse generation. The scaling or shifting may be applied to the sync pulse after generation. In some implementations, the signal driving circuit 416 may retrieve the waveform profile directly from the memory 414.

A first line attached to the positive terminal 420 and a second line attached to the negative terminal 422 may be a wire twisted pair. The first line and the second line may have a balanced output impedance. Additionally, the improved sync pulse signal may be symmetrical with respect to time. The improved sync pulse signal may have the same rise and/or fall times as the original PSI5 sync pulse signal. The improved sync pulse signal may have positive initial slope and negative second slope. The improved sync pulse signal may match PSI5 specifications.

To generate the waveform profile, the processor 412 may process an original trapezoidal PSI5 sync pulse signal, for example as shown in FIG. 2. The processor 412 may process the original signal by applying a spectrum analysis, such as a domain conversion (e.g. Fourier Transform, Fast Fourier Transform, FDTD, or other time to frequency conversion). The processor 412 may then remove spectral components above a first threshold frequency, and below a second threshold frequency, or both. The processor 412 may then perform an additional spectral analysis, such as frequency to time domain conversion (e.g. an Inverse Fourier Transform, Inverse Fast Fourier Transform, or other frequency to time domain conversion). The processor 412 may remove ripples in the data before and/or after the pulse using a smoothing algorithm or other filtering algorithm. The processor 412 may then remove any DC offset of the waveform profile and store the waveform profile in the memory 414 for later retrieval. The waveform profile may be stored as a set of voltage values at specific times offsets from a reference, although other formats may be used.

Figure 5A:
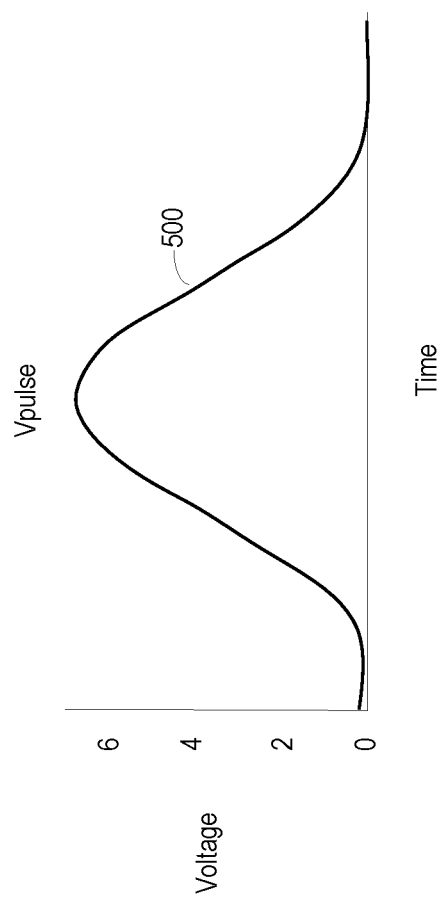
FIGS. 5a and 5b are illustrations of the sync pulse signals that may be provided by the generated by the controller and stored in a memory.
Figure 5B:
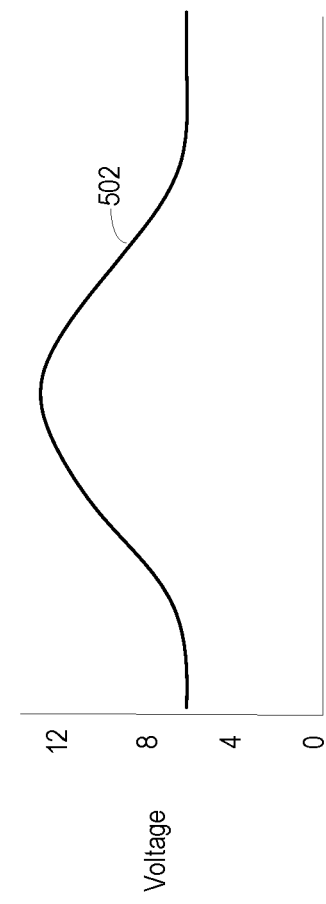

FIG. 5a is a graph illustrating one example of the waveform profile 500 that may be stored in memory by the signal controller. The waveform profile 500 may be generated as discussed elsewhere in this application. FIG. 5b is a graph illustrating one example of a waveform profile 502 being processed to add a DC bias.

Figure 6:
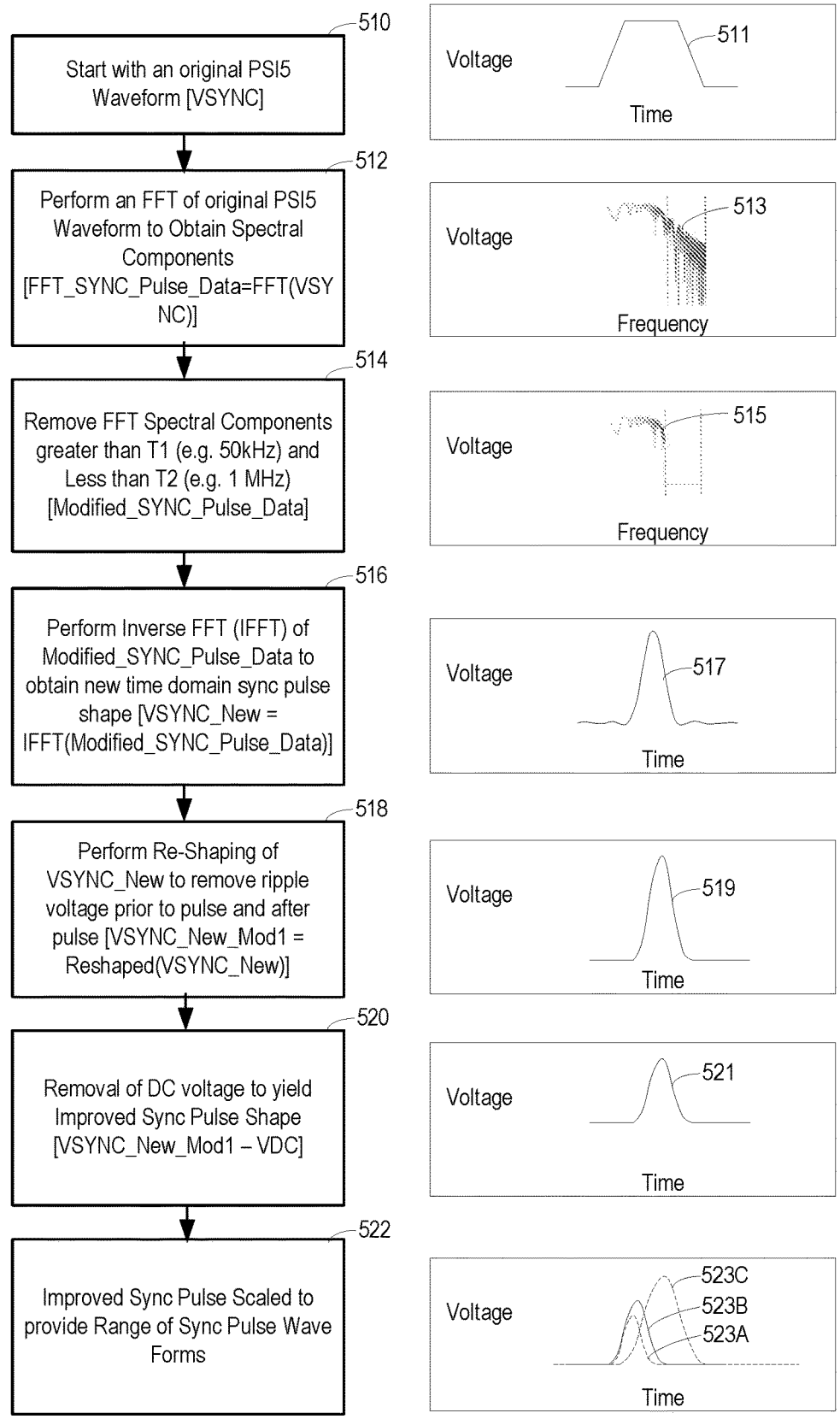
FIG. 6 is a flow diagram illustrating generation of an improved sync pulse signal.

FIG. 6 is a method for generating an improved sync pulse waveform for a sensor. The method begins in step 510. In step 510, an original PSI5 waveform (e.g. a trapezoidal waveform) [VSYNC] is provided. One example of an original PSI5 trapezoidal waveform is waveform 511. In step 512, a spectral conversion such as a time to frequency domain conversion may be performed on the original waveform (e.g. Fast Fourier Transform (FFT) of the original PSI5 Trapezoidal Wave form) may be performed to obtain spectral components. [FFT_SYNC_Pulse_Data=FFT(VSYNC)]. One example of spectral data from the original PSI5 trapezoidal waveform is line 513. In step 514, the FFT spectral components greater than a first threshold frequency (e.g. 50 kHz) and less than a second threshold frequency (e.g. 1 MHz) may be removed from the spectral components [Modified_SYNC_Pulse_Data]. One example of the modified FFT spectral data is line 515.

In step 516, an Inverse FFT (IFFT) of Modified_SYNC_Pulse_Data may be performed to obtain a new time domain sync pulse shape [VSYNC_New=IFFT(Modified_SYNC_Pulse_Data)]. One example of the new time domain sync pulse shape is waveform 517. In block, 518 re-shaping of VSYNC_New may be performed to remove ripple voltage prior to the pulse and after the pulse [VSYNC_NewMod1=Reshaped(VSYNC_new)]. One example of the re-shaped sync pulse waveform is waveform 519. In block 520, the DC voltage may be removed to yield the improved sync pulse shape [VSYNC_NewMod1−VDC]. The waveform profile of the improved sync pulse shape may be stored in a memory for use in generating the improved sync pulse in real time by a sync pulse driver. One example of the improved sync pulse shape is waveform 521. In block 522, the improved sync pulse shape may be scaled in time or voltage based on application requirements by the sync pulse driver. Three (3) examples of improved sync pulse shapes scaled in time or voltage amplitude are waveforms 523A, 523B and 523C.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

As a person skilled in the art will readily appreciate, the above description is meant as an illustration of the principles of this disclosure. This description is not intended to limit the scope or application of this disclosure in that the systems and methods are susceptible to modification, variation and change, without departing from spirit of this disclosure, as defined in the following claims.

The invention claimed is:

1. A restraint control module configured to communicate a sync pulse to a sensor having Peripheral Sensor Interface 5 (PSI5) timing compliance, the module comprising;
   a memory configured to store a waveform profile of the sync pulse; and
   a sync pulse driver connected to the memory and a first signal line, wherein the sync pulse driver retrieves the waveform profile from the memory and generates the sync pulse on the first signal line corresponding to the waveform profile, the waveform profile stored in the memory being derived from a PSI5 compliant sync pulse with reduced electro-magnetic emissions through spectrum analysis, wherein the waveform profile is derived by converting the PSI5 compliant sync pulse to a frequency domain signal.

2. The restraint control module according to claim 1, wherein the PSI5 compliant sync pulse is converted to the frequency domain signal by applying a Fast Fourier Transform and processing the frequency domain signal to generate a modified frequency domain signal.

3. The restraint control module according to claim 1, wherein frequencies above a first threshold frequency are removed from the frequency domain signal to generate the modified frequency domain signal.

4. The restraint control module according to claim 3, wherein frequencies below a second threshold frequency are removed from the frequency domain signal to generate the modified frequency domain signal.

5. The restraint control module according to claim 4, wherein the modified frequency domain signal is converted back to a time domain signal.

6. The restraint control module according to claim 5, wherein the modified frequency domain signal is converted back to the time domain signal by applying an inverse fast Fourier transform.

7. The restraint control module according to claim 6, wherein the time domain signal is filtered to remove second and greater order ripples before and after a primary pulse in the time domain signal to generate a modified sync pulse.

8. The restraint control module according to claim 7, wherein a direct current voltage offset is removed from the modified sync pulse to generate a shaped sync pulse, the waveform profile corresponding to the shaped sync pulse.

9. The restraint control module according to claim 1, wherein a second signal line of the restraint control module is connected to a reference voltage.

10. The restraint control module according to claim 9, wherein the first line and the second line are a wire twisted pair.

11. The restraint control module according to claim 9, wherein the first line and the second line have a balanced output impedance.

12. A system configured to communicate a sync pulse to a sensor having, the system comprising;
   a first signal line;
   a second signal line connected to a reference voltage, the first and second signal lines being a wire twisted pair with a balanced output impedance;
   a memory configured to store a waveform profile of the sync pulse; and
   a sync pulse driver connected to the memory and a first signal line, wherein the sync pulse driver retrieves the waveform profile from the memory and generates the sync pulse on the first signal line corresponding to the waveform profile, the waveform profile stored in the memory being derived from the sync pulse with reduced electro-magnetic emissions by applying a fast Fourier transform, removing at least one frequency band, and applying an inverse fast Fourier transform.

* * * * *